US009776548B1

United States Patent
Dziak

(10) Patent No.: US 9,776,548 B1
(45) Date of Patent: Oct. 3, 2017

(54) VEHICLE TIE DOWN DEVICE

(71) Applicant: Calsonic Kansei North America, Inc., Farmington Hills, MI (US)

(72) Inventor: Brian Thomas Dziak, White Lake, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 0 days.

(21) Appl. No.: 15/272,250

(22) Filed: Sep. 21, 2016

(51) Int. Cl.
*B60P 7/08* (2006.01)
*B60P 3/079* (2006.01)

(52) U.S. Cl.
CPC ............. *B60P 3/079* (2013.01); *B60P 7/0807* (2013.01)

(58) Field of Classification Search
CPC ....................................................... B60P 3/079
USPC .......... 410/8–11, 19–23, 104–106, 110, 166; 24/265 CD, 115 K
See application file for complete search history.

(56) References Cited

U.S. PATENT DOCUMENTS

| 4,487,537 | A | * | 12/1984 | Morse | B60P 7/12 410/100 |
| 4,611,961 | A | * | 9/1986 | Van Iperen | B60P 3/075 410/101 |
| 8,491,237 | B2 | * | 7/2013 | Parkinson | B60P 3/079 410/10 |

* cited by examiner

*Primary Examiner* — Stephen Gordon
(74) *Attorney, Agent, or Firm* — Foley & Lardner LLP

(57) ABSTRACT

A vehicle tie down device includes a base plate having an upper surface and a lower surface, the base plate defining at least two base plate bores therethrough, and a first bolt extending through a first of the base plate bores and a second bolt extending through a second of the base plate bores. The device further includes a first arm coupled to a lower end of the first bolt and a second arm coupled to a lower end of the second bolt, the arms configured to engage a T-slot, and a guide member extending from the lower surface of the base plate, the guide member disposed between the base plate bores. The device further includes a flange extending away from and substantially perpendicular to the upper surface of the base plate, the flange configured to support a tow hook.

19 Claims, 4 Drawing Sheets

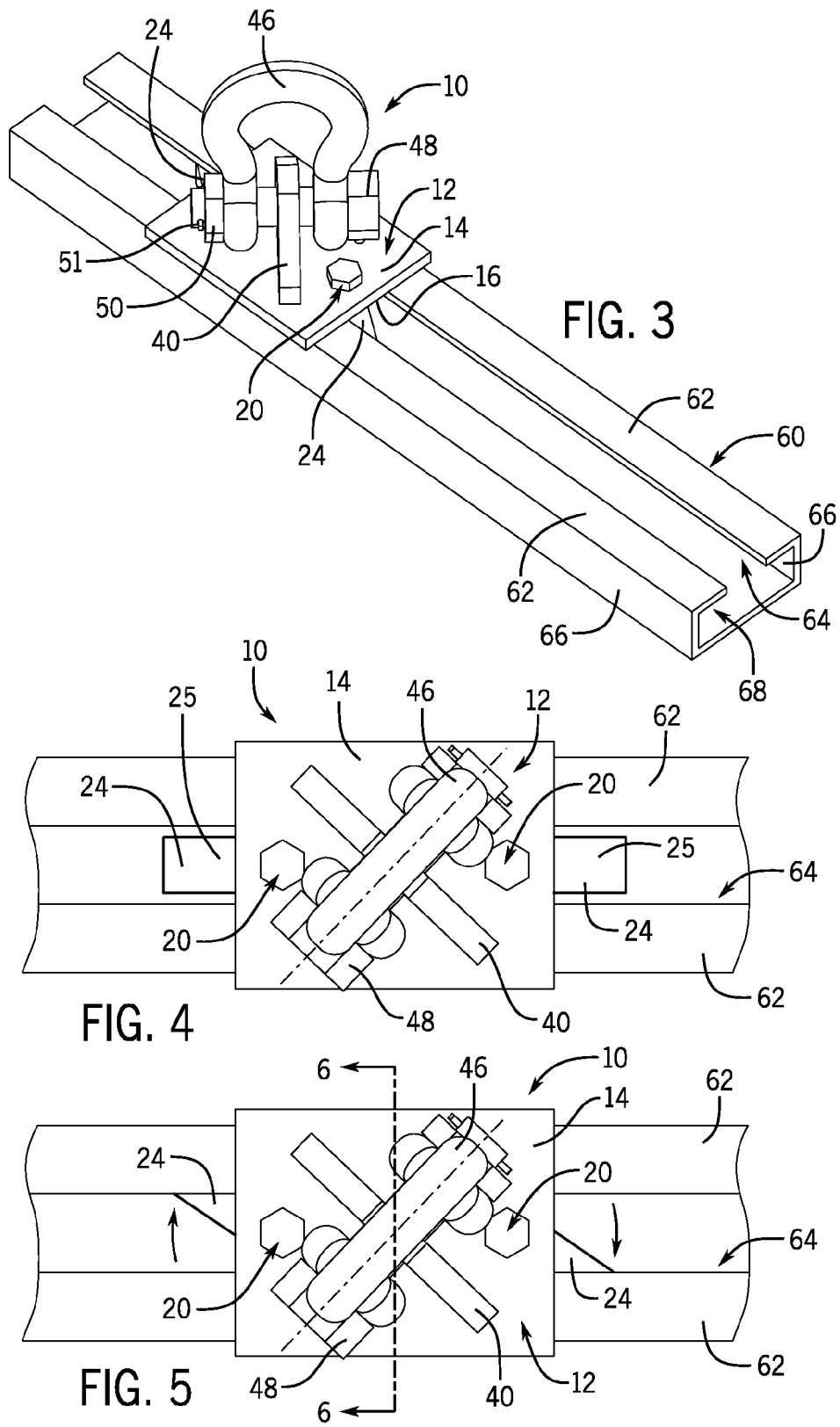

VEHICLE TIE DOWN DEVICE

BACKGROUND

The present application relates generally to the field of vehicle tie down devices. Specifically, the present application relates to devices for securing a vehicle in a fixed position, such as during a vehicle performance test or while the vehicle is being serviced or transported.

Vehicle tie downs are generally used in situations where a vehicle needs to be held or secured in a stationary position. For example, when the vehicle is placed on a dynamometer for measuring engine and/or transmission output to the wheels, the vehicle must be secured in place on the dynamometer so it does not move off the dynamometer when the wheels are turning. Similarly, when the vehicle is being tested in a wind tunnel, it must be secured in place in the event that the force of the wind on the vehicle is stronger than the static friction between the wheels and the ground, which would otherwise prevent the vehicle from moving during the test.

A conventional vehicle tie down may include a hook permanently connected to and extending upward from the ground or other platform. These hooks are generally not easily adjustable to support vehicles of different sizes without using different lengths of chain or requiring excessive winching of a chain or tie down strap. Accordingly, it would be advantageous to provide an improved vehicle tie down system that provides improved performance and flexibility as compared to current systems.

SUMMARY

One embodiment relates to a vehicle tie down device, including a base plate having an upper surface and a lower surface, the base plate defining at least two base plate bores therethrough, and a first bolt extending through a first of the base plate bores and a second bolt extending through a second of the base plate bores. The device further includes a first arm coupled to a lower end of the first bolt and a second arm coupled to a lower end of the second bolt, each of the arms configured to engage walls of a T-slot, and a guide member extending from the lower surface of the base plate, the guide member disposed between the base plate bores. The device further includes a flange extending away from and substantially perpendicular to the upper surface of the base plate, the flange configured to support a tow hook.

Another embodiment relates to a vehicle tie down assembly, including a vehicle tie down device and a T-slot. The vehicle tie down device includes a base plate having an upper surface and a lower surface, the base plate defining at least two base plate bores therethrough, and a first bolt extending through a first of the base plate bores and a second bolt extending through a second of the base plate bores. The device further includes a first arm coupled to a lower end of the first bolt and a second arm coupled to a lower end of the second bolt, a guide member extending from the lower surface of the base plate, the guide member disposed between the base plate bores, and a flange extending away from and substantially perpendicular to the upper surface of the base plate, the flange configured to support a tow hook. The T-slot includes opposing first and second outer walls defining a channel therebetween, and opposing first and second shoulders extending inward from the outer walls, the first and second shoulders defining an opening therebetween. The arms and the guide member are configured to be received in the opening in an aligned position.

Another embodiment relates to a method of tying down a vehicle, including linearly aligning a guide member and at least two arms proximate a lower surface of a vehicle tie down device, and inserting the guide member and the arms through an opening in a T-slot defined by opposing shoulders thereof. The method further includes articulating a bolt head configured to rotate each of the arms within a channel defined by the T-slot, and frictionally engaging each of the shoulders between the at least two arms and the lower surface of the vehicle tie down device.

BRIEF DESCRIPTION OF THE DRAWINGS

FIG. 3 is a top perspective view of the vehicle tie down device installed in a T-slot (which may be incorporated into a floor, platform, or other surface on which a vehicle may be secured), according to an exemplary embodiment.

FIG. 4 is a top plan view of the vehicle tie down device installed in a T-slot, with arms in an aligned position.

FIG. 5 is a top plan view of the vehicle tie down device of FIG. 4 secured to the T-slot, with arms in a rotated position.

DETAILED DESCRIPTION

Referring generally to the FIGURES, a vehicle tie down device is shown according to an exemplary embodiment. The device is configured to be adjustably received in a T-slot for securing a vehicle in a stationary position during a performance test.

Figure 1:
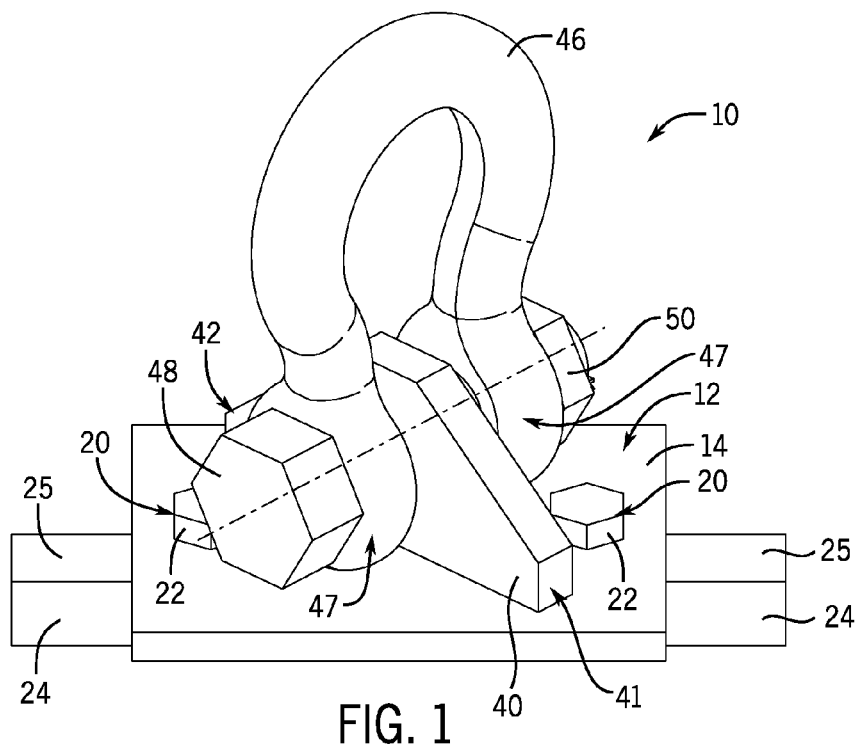
FIG. 1 is a top perspective view of a vehicle tie down device according to an exemplary embodiment.
Figure 2:
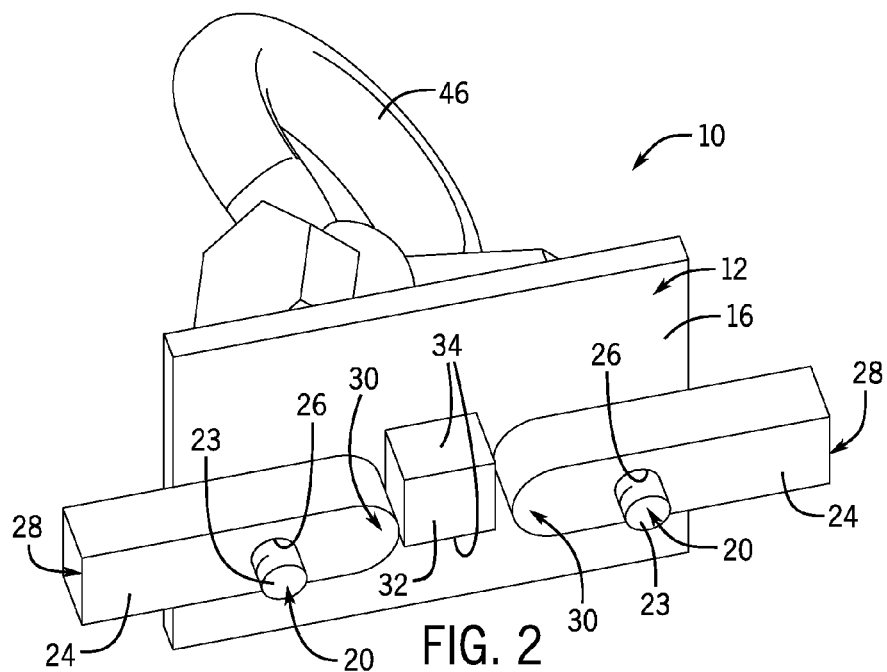
FIG. 2 is a bottom perspective view of the vehicle tie down device of FIG. 1.
Figure 8:
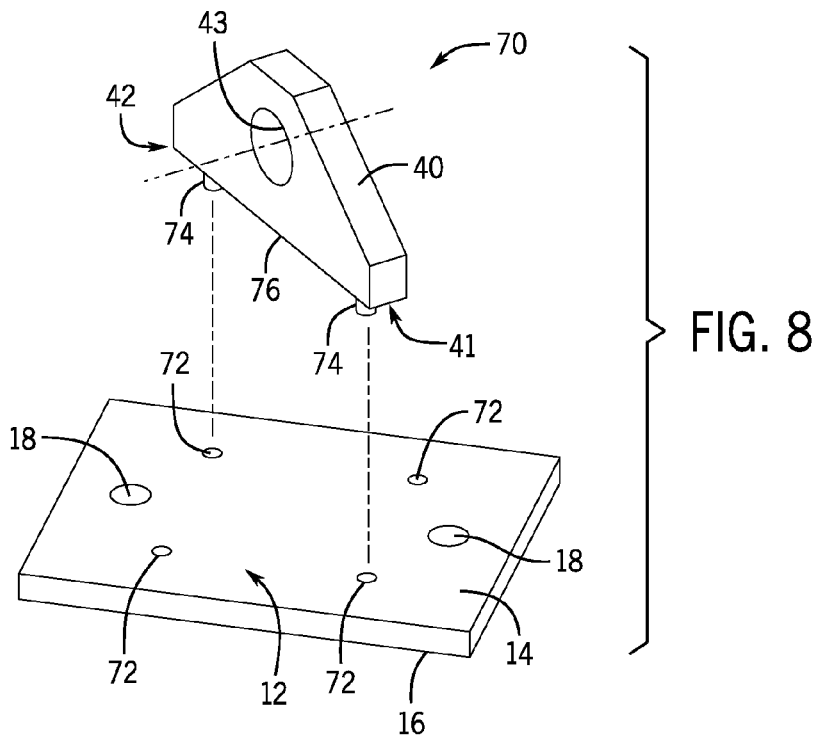
FIG. 8 is an exploded view of a plate assembly, according to an exemplary embodiment.

Referring now to FIGS. 1 and 2, a vehicle tie down device 10 is shown according to an exemplary embodiment. The device 10 includes a base plate 12 defining an upper (i.e., top) surface 14 and a lower (i.e., bottom) surface 16. The base plate 12 as shown is substantially rectangular, although according to other exemplary embodiments, the base plate 12 may have other shapes (e.g., circular, hexagonal, etc.). The base plate 12 defines a plurality of base plate bores 18 extending therethrough from the upper surface 14 to the lower surface 16. As shown in FIG. 8, the base plate 12 includes two base plate bores 18, although according to other exemplary embodiments, the base plate 12 may include more or fewer base plate bores 18. Each of the base plate bores 18 is configured to receive a corresponding bolt 20 therethrough. Each bolt 20 defines a head 22 configured to be articulated with a tool (e.g., wrench, screwdriver, etc.), such that each bolt 20 may be rotated within its respective base plate bore 18.

Referring to FIG. 2, arms 24 (i.e., elongated members) are coupled to a lower end 23 of each bolt 20. For example, the bolt 20 may be received in a hole 26 extending through the arm 24 and the arm 24 may then be welded to the bolt 20. In this configuration, the arm 24 is rotationally fixed relative to the bolt 20, such that the arm 24 may be rotated about an axis defined by the base plate bore 18 by articulating the head 22 of the respective bolt 20. The arm 24 is disposed proximate the lower surface 16 of the base plate 12 and the head 22 is disposed on an opposing side of the base plate 12, proximate the upper surface 14. While two arms 24 are shown, according to other exemplary embodiments, more or fewer arms 24 may be used. For example, the number of arms 24 and bolts 20 may correspond with the number of base plate bores 18 in the base plate 12.

Each arm 24 defines a first end 28 and an opposing second end 30 with the bolt 20 disposed therebetween. The hole 26 may be defined closer to the second end 30 than the first end 28, such that the bolt 20 is not centered within the arm 24. In this configuration, the first end 28 extends further than the second end 30 from the bolt 20. The second end 30 defines a substantially curved surface configured to not engage (i.e., may be spaced apart from) a guide member 32 as the bolt 20 is rotated in the base plate bore 18.

Figure 7:
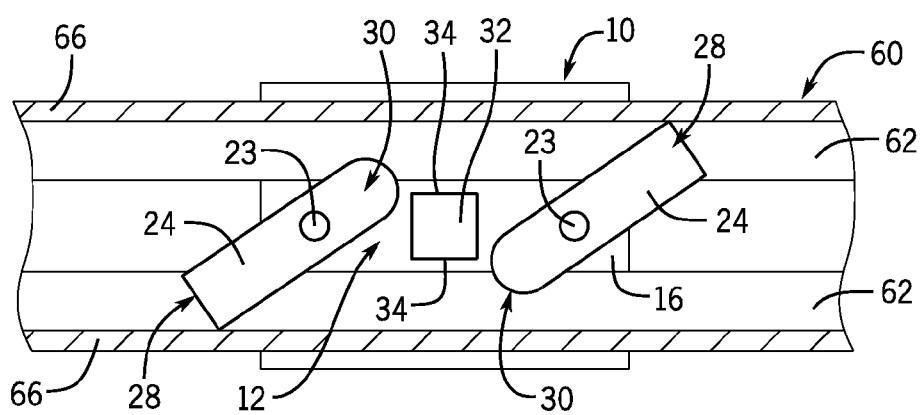
FIG. 7 is a bottom cross-section view of the vehicle tie down device of FIGS. 4-6, taken across line 7-7, showing the device installed in the T-slot.

Referring to FIG. 2, the guide member 32 is shown according to an exemplary embodiment. The guide member 32 extends away from and substantially perpendicular to the lower surface 16 of the base plate 12 at a central portion of the base plate 12. For example, the guide member 32 is disposed in line with and between (e.g., substantially halfway between) the base plate bores 18. The base plate bores 18 are offset (i.e., spaced apart) from the guide member 32, such that the second end 30 of the arms 24 are configured to not engage the guide member 32. The guide member 32 defines opposing parallel, planar sides 34 configured to engage a T-slot 60 for holding the device 10 rotationally fixed therein. As shown in FIGS. 2 and 7, the guide member 32 defines a generally rectangular (e.g., square) profile, although according to other exemplary embodiments, the guide member 32 may define other shapes with planar sides.

Referring again to FIG. 1, a flange 40 (i.e., upper plate) extends away from and substantially perpendicular to the upper surface 14 of the base plate 12. The flange 40 forms a substantially planar body, having a first end 41 and a second end 42 and a length therebetween angularly offset (e.g., clockwise or counterclockwise less than 90 degrees) from the sides 34 of the guide member 32. For example, the flange 40 and the sides 34 may define an angle between 40 and 50 degrees (e.g. approximately 45 degrees) therebetween when viewed from the upper surface 14 of the base plate 12. In this configuration, the flange 40 (e.g., a plane defined by the flange 40) may angularly bisect adjacent edges of the base plate 12. According to other exemplary embodiments, the flange 40 and the sides 34 may define other offset angles. The angular offset is configured to distribute loads applied substantially co-planar with the flange 40 to the base plate 12, reducing the likelihood of damage (e.g., bending, deforming, shearing, fracturing, etc.) to the flange 40 or other portions of the device 10. As shown in FIG. 1, the flange 40 is substantially trapezoidal, although according to other exemplary embodiments, the flange 40 may be other shapes (e.g., rectangular, triangular, etc.).

The flange 40 defines a flange bore 43 extending therethrough, the flange bore 43 configured for coupling a tow hook 46 (i.e., D-ring, eyelet, latch, etc.) thereto. The flange bore 43 may be disposed at a substantially central location along the length of the flange 40 (e.g., substantially halfway between the first and second ends 41, 42). For example, the bore 43 may be disposed above (i.e., over) the guide member 32. The flange bore 43 defines an axis 44 extending substantially orthogonal to the flange 40. A tow hook bolt 48 is received in a tow hook bore 49 defined through opposing ends 47 of the tow hook 46. The ends 47 of the tow hook 46 are disposed on opposing sides of the flange 40, and the tow hook bolt 48 is fed through and received in a first end 47 of the tow hook 46, the flange bore 43, and a second end 47 of the tow hook 46, and secured with a nut 50 and/or a pin 51 extending through a hole in the tow hook bolt 48. In this configuration, the tow hook 44 is configured to rotate about the axis 44 of the flange bore 43 and substantially coplanar with the flange 40.

Figure 6:
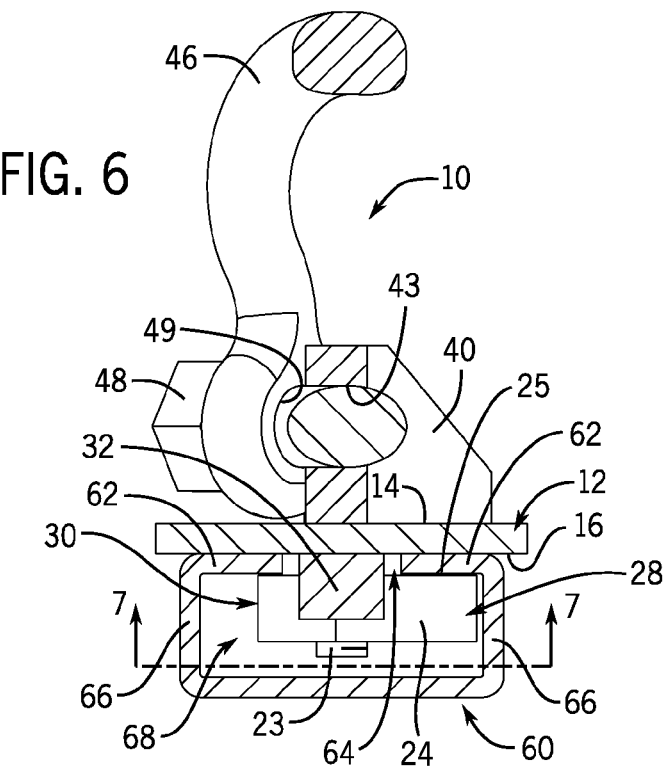
FIG. 6 is a side cross-section view of the vehicle tie down device of FIG. 5, taken across line 6-6, showing the device installed in the T-slot.

Referring generally to FIGS. 3-7, installation of the device 10 in a T-slot 60 is shown according to an exemplary embodiment. The T-slot 60 is a generally "T"-shaped slot defined in the ground, a platform, or other structure configured to serve as a mounting point for holding a vehicle or other object in a fixed position. Referring specifically to FIGS. 3 and 6, the T-slot 60 includes opposing shoulders 62 defining an opening 64 therebetween. The shoulders 62 extend inward from opposing outer walls 66, the outer walls 66 defining a channel 68 therebetween. The channel 68 has a width greater than a width of the opening 64.

Referring now to FIG. 4, each of the arms 24 and the guide member 32 define a width less than or substantially the same as the width of the opening 64, such that the arms 24 and guide member 32 may be received therethrough. The first and second ends 28, 30 of each of the arms 24 may be substantially aligned (e.g., linearly aligned) for insertion of at least a portion of the device 10 into the opening 64 of the T-slot 60. The sides 34 of the guide member 32 may engage the shoulders 62 of the T-slot 60 for holding the device 10 in a fixed orientation relative to the T-slot 40. When the device 10 is installed in the T-slot 60, the flange 40 is angularly offset from the T-slot 60 at substantially the same angle (e.g., approximately 45 degrees) that the flange 40 is offset from the sides 34 of the guide member 32.

Referring now to FIGS. 5-7, the arms 24 are shown in a rotated position. To transition between the aligned position and the rotated position, the heads 22 of the bolts 20 are articulated, rotating the arms 24 in the channel 68. When the arm 24 is in the rotated position, the first end 28 may engage a first outer wall 66 while the second end 30 is proximate to and spaced apart from an opposing second outer wall 66. In this configuration, the first end 28 of the arm 24 frictionally engages the first outer wall 66, preventing the device 10 from sliding along the T-slot 60. According to another exemplary embodiment, the second end 30 may engage the second outer wall 66 in substantially the same way as the first end 28.

Referring now to FIG. 6, the arm 24 may be disposed at a height on the bolt 20, such that an upper surface 25 of the arm 24 is offset from the lower surface 16 of the base plate 12 substantially the same distance as a thickness of the shoulders 62. In this configuration, when the arms 24 are in the rotated position, at least a portion of each of the shoulders 62 are disposed between the lower surface 16 of the base plate 12 and the upper surface 25 of the arm 24. Each of the lower surface 16 of the base plate 12 and the upper surface 25 of the arm 24 may frictionally engage the shoulders 62. For example, as shown in FIG. 6, the first end 28 may frictionally engage a first shoulder 62 and the second end 30 may frictionally engage an opposing second shoulder 62.

According to an exemplary embodiment, each the arms 24 may be rotated in the same direction (e.g., clockwise or counterclockwise) such that the first end 28 of each of the arms 24 engages an opposing outer wall 66 and/or shoulder 62 of the T-slot 60. In this configuration, the arms 24 may be oriented in substantially the same direction as the flange 40, such that a load applied onto the flange 40 through the tow hook 46 increases the normal force applied between the first end 28 of the arm 24 and the outer wall 66 of the T-slot 60, thereby increasing the static friction therebetween. According to an exemplary embodiment, the arms 24 may be substantially parallel to the flange 40 when the arms 24 engage the T-slot 60. According to another exemplary embodiment, the arms 24 may be rotated in opposite directions, such that the first end 28 of each of the arms 24 engages the same outer wall 66 and/or shoulder 62.

Referring now to FIG. 8, a plate assembly 70 is shown according to an exemplary embodiment. The flange defines a plurality of posts 74 extending from (i.e., disposed on) a bottom surface 76 of the flange 40. For example, as shown in FIG. 8, a post 74 may be disposed proximate each of the first and second ends 41, 42 of the flange 40. While two posts 74 are shown, according to other exemplary embodiments, more or fewer posts 74 may be used. The base plate 12 defines a plurality of holes 72 (i.e., indents, bores, etc.) in the upper surface 14 configured to receive corresponding posts 74 therein. The posts 74 act as guides for positioning the flange 40, such that when the posts 74 are received in the holes 72, the flange 40 is held in a fixed position relative to the base plate 12. The flange 40 may then be consistently joined (e.g., welded) to the base plate 12 at a predetermined angle.

The plurality of holes 72 define a grid. As shown in FIG. 8, the base plate 12 may include four holes 72, forming a rectangle (e.g., a square), although more or fewer holes 72 may be used. Holes 72 forming opposite corners of the grid may define a line therebetween, the line angularly offset from the sides 34 of the guide member 32. For example, the line extending between the opposing holes 72 and the sides 34 of the guide member 32 may define an angle of approximately 45 degrees therebetween when viewed from the upper surface 14 of the base plate 12. In this configuration, the line may angularly bisect adjacent edges of the base plate 12. According to other exemplary embodiments, the opposing holes 72 and the sides 34 of the guide member 32 may define other offset angles. While FIG. 8 shows the flange 40 angularly offset (e.g., approximately 45 degrees) clockwise relative to the sides 34, according to other exemplary embodiments, the flange 40 may be angularly offset at other angles or in other directions (e.g., counterclockwise) corresponding with other sets of opposing holes 72. For example, the posts 74 may be received in holes 72 defining a line angularly offset (e.g., approximately 45 degrees) counterclockwise relative to the sides 34 of the guide member 32. Where more than two holes 72 are formed in the base plate, the posts 74 may be received in a set of opposing holes 72, such that the flange 74 is positioned at a desired angle relative to the sides 34 of the guide member 32.

FIG. 8 shows the posts 74 extending from the bottom surface 76 of the flange 40. According to another exemplary embodiment, the posts 74 may be separately formed from the flange 40 and configured to be received in a plurality of holes defined in the bottom surface 76 of the flange 40. For example, the posts 74 may be separate components received in the holes 72 in the base plate 12 and the holes in the flange 40. According to another exemplary embodiment, the posts 74 may be integrally formed with the base plate 12 and received in the holes of the flange 40. According to yet another exemplary embodiment, the flange 40 and the base plate 12 may be threadably coupled. For example, the holes in the flange 40 may be internally threaded and aligned with the holes 72 in the base plate 12. A fastener may be fed through the holes 72 in the base plate 12 from the bottom surface 16 through the upper surface 14 until the fastener is threadably received in the holes in the flange 40. In this configuration, the flange 40 may be reconfigured between clockwise and counterclockwise orientations based on a testing scenario. According to another exemplary embodiment, the holes 72 in the base plate 12 may be internally threaded and the fasteners may be fed through the holes in the flange 40 for coupling the flange 40 thereto. While FIG. 8 shows a plurality of posts 74 and holes 72 for guiding the flange 40 relative to the base plate 12, other connections may be used. For example, at least one of the upper surface 14 of the base plate 12 and the bottom surface 76 of the flange 40 may include an elongated groove and the other may include a corresponding elongated key configured to be received in the groove.

Figure 9:
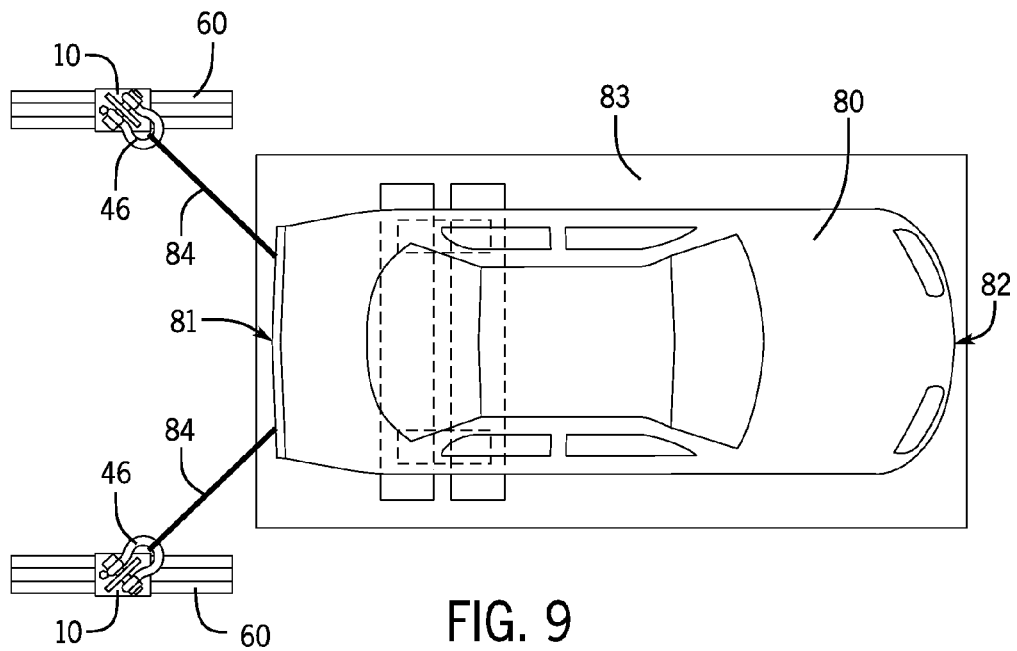
FIG. 9 shows the vehicle tie down device installed in a T-slot for use during a vehicle performance test.

Referring now to FIG. 9, a vehicle 80 is shown being restrained by the tie down device 10 on a testing apparatus 83 (e.g., dynamometer). In this configuration, the vehicle 80 is being restrained from moving forward on the testing apparatus 83 by a plurality of straps 84 (e.g., chain, rope, etc.) extending from a rear end 81 of the vehicle 80, each strap 84 being secured to a corresponding device 10 rearward of the vehicle 80. For example, such arrangement may restrain the vehicle 80 in a fixed position during testing on a dynamometer. Each strap 84 may be fed through or hooked to a corresponding tow hook 46 at an end of the strap 84 opposing the vehicle 80. According to another exemplary embodiment, the vehicle 80 may be restricted from moving rearward on the testing apparatus 83 by a plurality of straps 84 extending from a forward (i.e., front) end 82 of the vehicle 80, each strap 84 being secured to a corresponding device 10 forward of the vehicle 80. For example, such arrangement may restrain the vehicle 80 in a fixed position during testing in a wind tunnel. According to other exemplary embodiments, the vehicle 80 may be restrained from moving in other directions by straps 84 extending from other locations on the vehicle, the straps 84 secured to additional devices 10 positioned in other directions around the vehicle 80. For purposes of the present disclosure as it relates to the vehicle 80, the term "forward" (or similar terms) refers to a direction extending from the forward end 82 of the vehicle 80, away from the rear end 81 of the vehicle 80, while the term "rearward" (or similar terms) refers to a direction extending from the rear end 81 of the vehicle 80, away from the forward end 82 of the vehicle 80.

As shown in FIG. 9, the orientation of the flange 40 may be selected based on the location of the device 10 relative to the vehicle 80. For example, a device 10 with a flange 40 having a clockwise angular offset may be positioned on a rear left side of the vehicle 80 and a device 10 with a flange 40 having a counterclockwise angular offset may be positioned on a rear right side of the vehicle 80. The angular offset may be selected such that the strap 84 extends from the respective device 10 to a mounting point on the vehicle 80 substantially coplanar with the flange 40 of that device 10. In this configuration, the device 10 is best able to distribute loads to the base plate 12 during vehicle testing. A test setup may include two or more substantially parallel T-slots 60 on opposing sides of the vehicle 80. Each T-slot 60 may be configured to receive at least one device 10 therein.

The device 10 is configured to be repositionable along the T-slot 60 to accommodate vehicles 80 of different lengths and different testing conditions. For example, for a shorter vehicle, the devices 10 may be disengaged from, repositioned within, and secured to (e.g., engaging) the T-slot 60 closer to the vehicle 80. Similarly, for a longer vehicle, the devices 10 may be disengaged from, repositioned within and secured to (e.g., engaging) the T-slot 60 further from the vehicle 80. In this configuration, when vehicles 80 of different sizes are tested in quick succession, the time-intensive step of ratcheting adjustable straps may be reduced or eliminated while allowing for testing of the different vehicles 80 on the same testing apparatus 83.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A vehicle tie down device, comprising:
    a base plate having an upper surface and a lower surface, the base plate defining at least two base plate bores therethrough;
    a first bolt extending through a first of the base plate bores and a second bolt extending through a second of the base plate bores;
    a first arm coupled to a lower end of the first bolt and a second arm coupled to a lower end of the second bolt, each of the arms configured to engage walls of a T-slot;
    a guide member extending from the lower surface of the base plate, the guide member disposed between the base plate bores; and
    a flange extending away from and substantially perpendicular to the upper surface of the base plate, the flange configured to support a tow hook.

2. The device of claim 1, wherein the guide member defines planar parallel sides configured to engage a T-slot.

3. The device of claim 2, wherein the flange is angularly offset from the sides of the guide member.

4. The device of claim 1, further comprising a flange bore defined in the flange and having an axis substantially perpendicular to the flange; and
    a tow hook coupled to the flange bore, such that the tow hook is configured to rotate about the axis.

5. The device of claim 4, wherein the tow hook is a D-ring.

6. The device of claim 1, wherein each arm is rotationally fixed relative to its corresponding bolt, such that the arm rotates when such bolt is articulated.

7. The device of claim 1, wherein each arm has a first end and an opposing second end; and
    wherein at least one of the first and second ends is configured to frictionally engage a T-slot.

8. The device of claim 7, wherein the bolt for each arm is disposed closer to the first end than to the second end of the arm.

9. The device of claim 1, wherein at least one of the base plate and the flange defines a plurality of holes and the other of the base plate and the flange defines a plurality of posts configured to be received in the plurality of holes for guiding the flange into a desired orientation relative to the base plate.

10. A vehicle tie down assembly, comprising:
    a vehicle tie down device comprising:
        a base plate having an upper surface and a lower surface, the base plate defining at least two base plate bores therethrough;
        a first bolt extending through a first of the base plate bores and a second bolt extending through a second of the base plate bores;
        a first arm coupled to a lower end of the first bolt and a second arm coupled to a lower end of the second bolt;
        a guide member extending from the lower surface of the base plate, the guide member disposed between the base plate bores; and
        a flange extending away from and substantially perpendicular to the upper surface of the base plate, the flange configured to support a tow hook; and
    a T-slot comprising:
        opposing first and second outer walls defining a channel therebetween;
        opposing first and second shoulders extending inward from the outer walls, the first and second shoulders defining an opening therebetween;
    wherein each of the arms is configured to engage at least one of the outer walls of the T-slot; and wherein the arms and the guide member are configured to be received in the opening in a linearly aligned position.

11. The assembly of claim 10, wherein the guide member defines planar parallel sides configured to engage the shoulders of the T-slot, such that the base plate is rotationally fixed relative to the T-slot.

12. The assembly of claim 10, wherein an upper surface of each arm is offset from the lower surface of the base plate substantially the same distance as a thickness of the first and second shoulders.

13. The assembly of claim 12, wherein each arm defines a first end and an opposing second end, such that in a rotated position, an upper surface of the arm at the first end is configured to frictionally engage the first shoulder.

14. The assembly of claim 13, wherein the upper surface of the arm at the second end is configured to frictionally engage the second shoulder.

15. The assembly of claim 13, wherein in the rotated position, the first end of the arm engages the first outer wall, and the second end of the arm is spaced apart from the second outer wall.

16. The assembly of claim 10, wherein the flange is angularly offset from sides of the guide member.

17. The assembly of claim 10, further comprising a second T-slot substantially parallel to the T-slot, the second T-slot configured to receive a second vehicle tie down device therein.

18. The assembly of claim 17, wherein the flange of the vehicle tie down device is angularly offset clockwise less than 90 degrees from the T-slot; and wherein the flange of the second vehicle tie down device is angularly offset counterclockwise less than 90 degrees from the second T-slot.

19. The assembly of claim 10, further comprising a second vehicle tie down device, wherein the vehicle tie down device is secured to a rear end of a vehicle and is configured to prevent the vehicle from moving forward; and wherein the second vehicle tie down device is secured to a forward end of the vehicle and is configured to prevent the vehicle from moving rearward.

\* \* \* \* \*